United States Patent Office 2,951,197
Patented Aug. 30, 1960

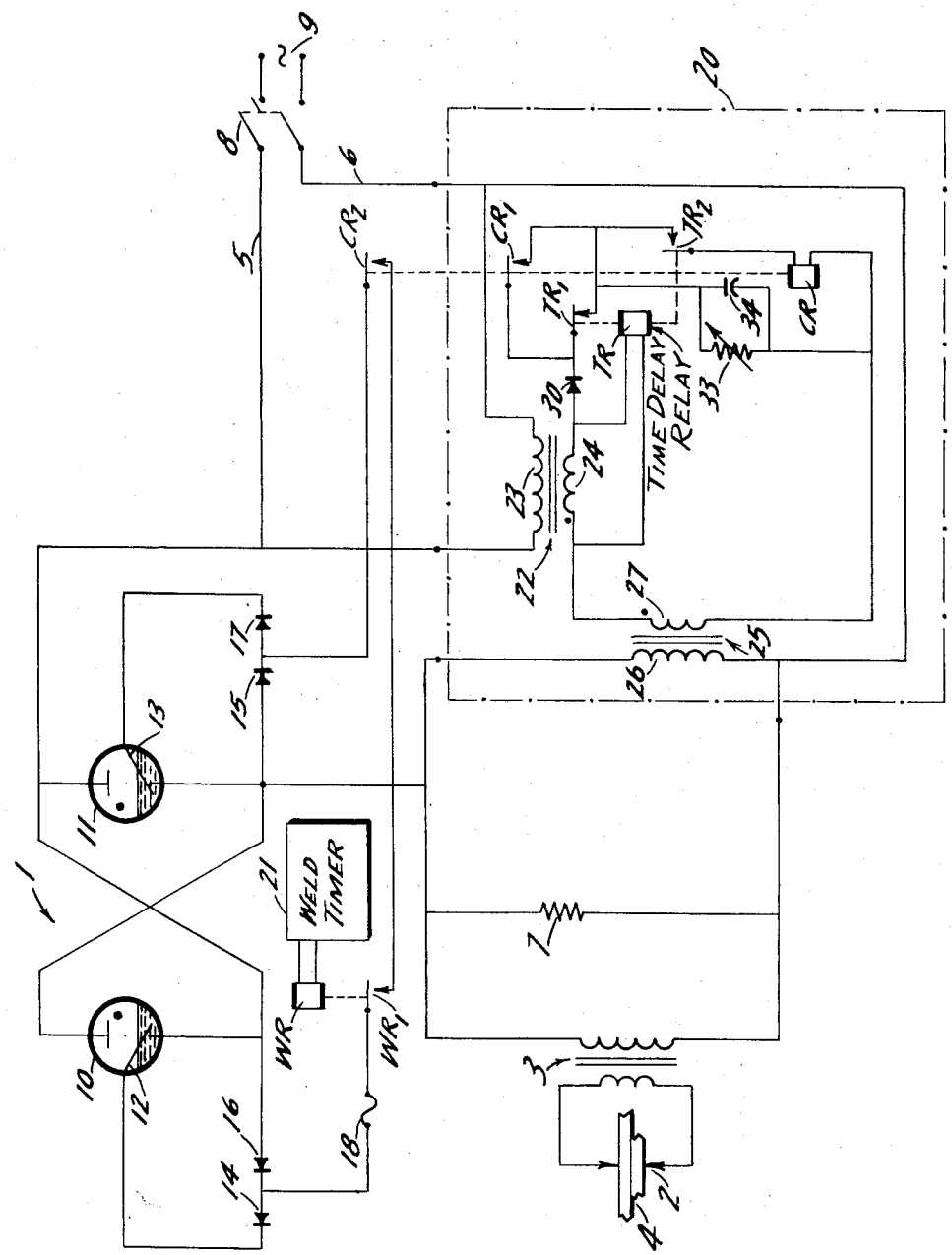

2,951,197

TIME LIMIT CIRCUITS

Addison K. Broyles, Covina, Calif., and Robert C. Mierendorf and Clarence W. Porter, Wauwatosa, Wis., assignors to Square D Company, Detroit, Mich., a corporation of Michigan Filed June 19, 1956, Ser. No. 592,419

14 Claims. (Cl. 323—58)

The present invention relates to time limit circuits and more particularly to time limit circuits for limiting the time interval of predetermined circuit operations.

In resistance welding two or more metallic parts are joined by passing an electric current through the parts at a point or points pressed together by welding electrodes connected to a power source through a welding transformer. The formation of the weld results from the heat created by the resistance of weldments or parts between the welding electrodes and the electrodes themselves.

One of the methods employed to produce the desired weld characteristics and control the welding operation is to limit the time duration of the welding current by a weld timer which controls a switch or contactor connecting the power source to the welding transformer. However, if the weld timer, contactor or other circuitry should become erratic and fail to interrupt the supply to the welding transformer at the end of the weld time interval, the welding electrodes may separate while welding current is still flowing causing dangerous arcing across the electrodes, or, if the electrodes are not separated the electrodes, cable or other parts of the welding equipment become overheated causing them to weld together or explode. In addition to the aforementioned destructive and costly consequences, welder current interruption failures are extremely hazardous to the welder machine operator or persons in the vicinity.

At the present time, attempts to remedy current interruption failure have been directed to separating the welding electrodes to prevent welding of the electrodes or explosions. This has resulted in the dangerous arcing across the electrodes and possible explosion.

The present embodiment of the invention has been directed to limiting welding current time duration wherein the contactor connecting the power source to the welding transformer is interrupted automatically by opening the contactor control circuit after a predetermined time period which begins at instant the power source is connected to the welding transformer and ends shortly after the welding current time interval. Further, if the welding current time should exceed the predetermined time period, due to component or other failure, and the supply is interrupted automatically, the welding current transformer cannot be connected to the power source until a power switch or other means disconnects the welder machine or control system from the power source. Thus upon a reoccurrence of the malfunctioning the time limit circuit of the present invention prevents "on-off" operation of the welding equipment, protecting the equipment and assuring proper welding time intervals for desirable weld characteristics. It is an object, therefore, of the present invention to provide a welding control system having the forementioned desirable characteristics and advantages.

Another object is the provision of a timing circuit for limiting the time interval of predetermined circuit operations.

A further object of the present invention is to provide a time limit circuit for controlling the time period of an impressed voltage.

Still another object is the provision of a timing circuit for limiting the period of welding current in welding equipment.

A further object of the invention is to provide a welding control circuit which automatically interrupts the welding current after a predetermined period of time which is longer than the welding current time period.

Another object of the present invention is the provision of welding control circuit interrupting automatic operation after the welding current upon failure of components.

Further objects and features of the invention will be readily apparent to those skilled in the art from the specification and appended drawing illustrating a preferred embodiment.

Referring now to the drawing, there is shown the preferred embodiment of a time limit circuit for interrupting the power supply to welding transformer 3 having welding electrodes 2 connected across the welding transformer secondary. The weldments 4 which are shown pressed between welding electrodes 2 and positioned for welding current to be passed through the material at the points between the electrodes wherein the heat for the formation of the weld is created by the resistance of the parts and the welding electrodes 2 to the passage of electric current supplied by the welding transformer 3.

The welding transformer 3 is connected to an A.C. supply source 9 by supply lines 5 and 6 through an electronic contactor 1 interrupting power to the welding transformer. The interruption of power for welding operation is controlled by the weld timer 21 energizing the welding relay WR to operate welding relay contacts WR1 in the electronic contactor control circuit. The weld timer 21 may comprise any conventional time unit for controlling the time interval during which the switch or contactor 1 is closed, such as motor driven cams, pneumatic timers or tube relay, wherein said timers have an output circuit to actuate the relay WR to close the welding timer contacts WR1.

The time limit circuit 20 includes a control relay CR having contacts CR2 in series with the welding relay contacts WR1 to interrupt the supply to the welding transformer 3 when welding current flows through the welding transformer 3 over a predetermined time interval. The time interval of the time limit safety circuit 20 may be adjusted to prevent welding current from flowing over an extended time period resulting from component or other failure e.g., the weld timer 21 or electronic contactor 1.

The electronic contactor circuit is equivalent to single pole single throw electronic power switch including two ignitrons 10 and 11, connected in inverse parallel or back to back. The ignitor current for ignitron 11 may be provided through a circuit including welding relay contacts WR1, control relay contacts CR2, rectifier 16 connected to supply line 5, and rectifier 17, connected to the ignitor 13. The ignitor 12 for ignitron 10 has a common current path through welding relay contacts WR1 and control relay contacts CR2. The remainder of the circuit to ignitor 12 includes rectifier 15 connected to the supply line 6 through control relay contacts CR2 and the primary of welding transformer 3 and rectifier 14 connected directly to the ignitor 12.

The rectifiers 14 and 16 prevent reverse current from flowing through the ignitor 12 and rectifiers 15 and 17 prevent the reverse current from flowing through the ignitor 13 and interruption of the ignitor circuit by the opening of contacts WR1 or CR2 prevent the conduction of ignitor current and ignitrons 10 and 11 on succeeding cycles of current applied from the power source 9 thereby interrupting power applied to the welding transformer 3 and the welder load.

The time limit safety circuit is connected to the supply lines 5 and 6 by the transformer 22 having a primary 23 connected across said supply lines and a secondary 24 connected in a time limit circuit. The slow to operate timing relay TR is connected across the secondary 24 and has a time delay to permit storage capacitor 34 to charge before operating normally closed timing relay break contacts TR1. The timing circuit includes storage capacitor 34 connected in parallel with the control relay CR and supplied from the secondary 24 thru the rectifier 30 and alternate current paths including either time relay break contacts TR1 or control relay make contacts CR1. Normally open timing relay make contacts TR2 are connected in series with the control relay CR interrupting the circuit path to said relay during the time delay provided by timing relay TR or when the timing circuit is not energized. An adjustable resistor 33 is connected across storage capacitor 34 to control or adjust the discharge time of capacitor 34 in the timing circuit.

The voltage applied to the primary of the welding transformer 3 is also applied across the primary 26 of the coupling transformer 25, having a secondary 27 in the time limit safety circuit. The voltage induced in the secondary 27 is adjusted to be equal and opposite to the voltage induced across the secondary 24 of the transformer 22 and is connected in series opposition with said secondary. Resistors may be connected across the secondaries 24 and 27 to provide an adjustment if the voltages are not of the same magnitude.

*Operation*

In operation, both halves of the A.C. cycle are applied to the welding transformer from the power source 9 during the weld time interval. Ignitrons 10 and 11 of the electronic contactor are conductive during corresponding half cycles by completing the control circuit to the ignitors 12 and 13. The control circuit for the electronic contactor is closed by operating welding relay make contacts WR1 and control relay make contacts CR2. Welding relay WR is actuated to close normally opened relay contacts WR1 during the time interval and control relay make contacts are closed by the operation of control relay CR connected in the time limit safety circuit 20.

To operate control relay CR, power must be applied to the primary of transformer 22 inducing a voltage across the secondary 24. The voltage induced across the secondary 24 is impressed across the timing relay TR which is actuated after a predetermined time delay. During the time interval of delay of the relay TR storage capacitor 34 is charged during positive cycles of the voltage induced across the secondary 24 through the charging circuit including normally closed timing relay break contacts TR1. The storage capacitor 34 is charged during the timing relay interval whereupon relay TR opens the capacitor charging path through contacts TR1 and closes the circuit path to the control relay CR through normally open timing relay break contacts TR2. Control relay CR is actuated by the voltage across capacitor 34 and normally open control relay make contacts CR1 and CR2 are closed wherein contacts CR1 form an alternate charging path to the capacitor 34 and circuit holding path for control relay CR through the closed timing relay contacts TR2.

After contacts WR1 and CR2 are closed ignitor current is supplied to the ignitron 11 from the supply line 5 through rectifier 16, contacts WR1 and CR2, rectifier 17, ignitor 13, the primary of the welding transformer 3 and line 6, striking an arc across the main electrodes of the ignitron 11 during the positive half cycle. A portion of the load current conducted through the ignitor 12 of ignitron 10 strikes an arc across the main electrodes during the negative half cycle by completing circuit path from line 6 through the current path including the primary of the welding transformer 3, rectifier 15, contacts CR2 and WR1, rectifier 14, and ignitor 12 connected to the supply line 5 through the cathode of ignitron 10.

The electronic contactor supplies an A.C. voltage across the primary of the welding transformer to produce a welding current to the welding electrodes 2 and weldments 4. The voltage applied across the primary of the weld transformer 3 is also applied to the primary 26 of the coupling transformer 25 inducing a voltage across the secondary 27 equal and opposite to the voltage across the secondary 24 during the welding time interval. As soon as the voltage is induced across the secondary 27 storage capacitor 34 begins to discharge through the coil of the relay CR and resistor 33. Capacitor 34 maintains control relay CR actuated for a time interval determined by the discharge time of capacitor 34 through the coil of the control relay CR and adjustable resistor 33.

If the weld timer 21 and the remainder of the supply circuit is functioning properly, the supply voltage to the welding transformer and coupling transformer is interrupted and no voltage is induced on the coupling transformer 27 in the time limit circuit, secondary 24, therefore, is supplying the only voltage in the time limit circuit charges capacitor 34 and supplies the control reday CR to maintain it actuated to retain contacts CR1 and CR2 closed.

If the weld time interval continues uninterrupted and the electronic contactor continues to supply a voltage to the welding transformer 3 beyond the time interval of the time limit circuit, storage capacitor 34 discharges completely at the end of a predetermined time interval which is of longer duration than the welding time interval, and control relay CR is deenergized opening contacts CR1 and CR2. Contacts CR2 interrupt the control path for ignitor current to the ignitors 12 and 13 turning off ignitrons 10 and 11 and the voltage supplied to the welding transformer.

In order to reset the time limit safety circuit 20, power switch 8 must be opened to permit de-energization of the time relay TR closing the charging path to the storage capacitor 34 through normally closed timing relay contacts TR1. Upon closing power switch 8, connecting the supply source 9 to the time limit safety circuit 20, the circuit is reset and the voltage induced across secondary 24 begins charging the storage capacitor 34 and renewing the cycle to place the timing circuit in standby position for timing the welding current interval.

Before the power switch 8 is reclosed the welding machine operator will have an opportunity to check the electronic contactor and weld timer to determine the reason for the supply circuit failure to interrupt the welding current at the end of the welding time interval.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

We claim:
1. A time limit circuit comprising; electrical storage means and voltage sensitive means connected in parallel with said storage means, first circuit means for connecting a first voltage reference source to said parallel circuit to charge said storage means and operate said voltage sensitive means, second circuit means for connecting a second voltage source in series opposition to said first voltage source wherein said voltage to be timed is not lower or higher than said reference by an amount capable of operating said voltage sensitive means whereby the voltage sensitive means remains operative for the duration of the storage means discharge time to the operative level of said voltage sensitive means.

2. A time limit circuit comprising; electrical storage means and voltage sensitive means connected in parallel with said storage means, first circuit means including an unidirectional device connecting a first reference voltage source to said parallel circuit to charge said storage means and operate said voltage sensitive means, second circuit means for connecting a second voltage source whose duration is timed in series opposition to said reference voltage source wherein said voltage to be timed is not lower or higher than said reference voltage by an amount capable of operating said voltage sensitive means whereby the voltage sensitive means remains operative for the duration of the storage means discharge time to the voltage level capable of maintaining said voltage sensitive means operative.

3. A time limit circuit comprising; a capacitor and voltage sensitive means connected in parallel with said capacitor, first circuit means for connecting a reference voltage to said parallel circuit for charging said capacitor and operating said voltage sensitive means, second circuit means for connecting an approximately equal voltage to be timed in duration in series opposition to said reference voltage, said time limit circuit being responsive to said opposing voltage to discharge said capacitor through said voltage sensitive means to maintain said latter means operative for a time interval limited by the discharge time of said capacitor to the voltage capable of maintaining said voltage sensitive means operative.

4. A time limit circuit comprising; a capacitor and voltage sensitive means connected in parallel with said capacitor, first circuit means including an unidirectional device for connecting a reference A.C. voltage source in series with said parallel circuit for charging said capacitor and operating said voltage sensitive means, second circuit means for connecting an approximately equal A.C. voltage source to be timed in duration in series opposition to said reference voltage, said time limit circuit being responsive to said opposing voltage to discharge said capacitor through said voltage sensitive means to maintain said latter means operative for a time interval limited by the discharge time of said capacitor to the operative voltage level of said voltage sensitive means.

5. A time limit circuit comprising; a timing circuit including a capacitor and voltage sensitive means connected in parallel with said capacitor, first circuit means including an unidirectional device for connecting a reference A.C. voltage to said timing circuit for charging said capacitor and operating said voltage sensitive means, second circuit means for connecting an approximately equal voltage to be timed in duration, in series opposition to said reference voltage, said time limit circuit being responsive to said opposing voltage to discharge said capacitor through said voltage sensitive means and maintain said latter means operative during the discharge time of said capacitor to be operative voltage level of said voltage sensitive means.

6. A time limit circuit comprising; a timing circuit including a capacitor and voltage sensitive means connected in parallel with said capacitor, first circuit means including an unidirectional device for connecting a reference A.C. voltage to said timing circuit for charging said capacitor and operating said voltage sensitive means, second circuit means for effectively disconnecting said voltage for a period to be timed, said time limit circuit being responsive to the absence of said voltage to discharge said capacitor through said voltage sensitive means and maintain said latter means operative during the discharge time of said capacitor to the operative voltage level of said voltage sensitive means.

7. A time limit circuit comprising; a timing circuit including a capacitor and voltage sensitive means connected in parallel with said capacitor, first circuit means for connecting a reference voltage to said timing circuit for charging said capacitor and operating said voltage sensitive means, second circuit means for connecting an approximately equal voltage to be timed in duration, in series opposition to said reference voltage, said time limit circuit being responsive to said opposing voltage to discharge said capacitor through said voltage sensitive means and releasing said voltage means upon discharge of said capacitor below the voltage sensitive level necessary to maintain said latter means operative.

8. A time limit circuit comprising; a timing circuit including a capacitor and voltage sensitive means connected in parallel with said capacitor, first circuit means including a unidirectional device in series for connecting a reference A.C. voltage to said timing circuit for charging said capacitor and operating said voltage sensitive means, second circuit means for connecting an approximately equal A.C. voltage to be timed in duration, in series opposition to said reference voltage, said time limit circuit being responsive to said opposing voltage to discharge said capacitor through said voltage sensitive means and releasing said voltage means upon discharge of said capacitor below the voltage sensitive level necessary to maintain said latter means operative.

9. A circuit for limiting the time intervals of applying power to an electrical load from an A.C. power supply comprising in combination; electrical storage means, circuit means including a voltage sensitive control means providing a discharge path for said storage means, said control means including means in said power circuit for disconnecting said power supply from said load, first circuit means including an unidirectional device in series with said storage means and said control means for connecting an A.C. voltage source to said electrical storage means through initial and standby circuit paths, a second voltage sensitive means for connection to said A.C. voltage source having means slow to operate in response to said A.C. voltage source to open said initial circuit path to said storage means and close said discharge path, said control means being operative in response to said A.C. voltage source to complete said standby circuit path from said voltage source to said storage means and control means, a second circuit means including a second A.C. voltage source for deriving an A.C. voltage approximately equal to the voltage of said first mentioned A.C. voltage source, said second voltage source being coupled with said power circuit whose duration is to be timed, and connected in series opposition to said first mentioned A.C. voltage source, said electrical storage means being responsive to the derived voltage of both voltage sources to cancel the effect of said first mentioned A.C. voltage source on the electrical storage means and said control means whereby said electrical storage means begins a limited interval discharge to the minimum operative voltage level of said control means releasing said control circuit means in said power circuit to interrupt the supply of power to said load.

10. The A.C. power supply circuit of claim 9 including means for interrupting the supply of power to said main load and time limit circuit to release said second voltage sensitive means and thereby reset said time limit circuit.

11. A welding control circuit in combination, an A.C. power source, a power circuit including an electronic contactor and a welding transformer connected to said source through said contactor, control circuit means for said electronic contactor including a weld timer for controlling a weld time interval connecting said power source to said transformer, a time limit circuit comprising a storage capacitor, circuit means for providing initial and alternate charging paths and a discharge path for said capacitor, a voltage sensitive control means having means in said contactor control circuit which is operative to complete said control circuit and means in said alternate charging path operative to complete said path, circuit means including an unidirectional device for connecting an A.C. reference voltage in series with said capacitor and voltage sensitive control means, a second voltage sensitive means having means slow to operate in response to said voltage for interrupting said series circuit path to said storage means and closing said discharge path, said voltage sensitive control means being responsive to the voltage on said capacitor to operate said means in the control circuit of said electronic contactor and said alternate circuit path, circuit means for coupling at least a portion of the voltage which is approximately equal to said reference voltage across said welding transformer in series opposition to said reference voltage to initiate the discharge of said capacitor whereby said control means is operative for a predetermined time interval at the end of which said control means becomes inoperative to open the control path in said electronic contactor and the alternate circuit to said capacitor, to interrupt the power supplied to the welding transformer.

12. The welding control circuit of claim 11 including means for interrupting the supply of power to said contactor and time limit circuit to release said slow to operate voltage sensitive means and thereby reset said time limit circuit.

13. In a welding control circuit, the combination comprising; an A.C. power source, a welding transformer, an electronic contactor conductive for connecting the welding transformer to the source, a timer for controlling the time interval of the connection, and a means including a transformer having a primary winding responsive to the current flow in the welding transformer and contactor for rendering the electronic contactor non-conductive independently of the timing means when the time interval of the connection exceeds the time interval normally determined by the timer.

14. In a welding control circuit, the combination comprising; an A.C. power source, a welding transformer having a primary winding connectible with the source and a secondary winding arranged to supply welding current to a pair of welding electrodes, an electronic contactor conductive for connecting the welding transformer primary and source, a timer connected to the contactor for controlling the time interval of conduction of the contactor and thereby the connection between the source and welder transformer primary, and means including a transformer having a primary winding connected in a parallel circuit with the primary winding of the welding transformer and in series circuit with the source and electronic contactor for limiting the time interval of the conduction of the electronic contactor independently of the operation of the timer.

References Cited in the file of this patent
UNITED STATES PATENTS

| | | |
|---|---|---|
| 2,532,825 | Storm | Dec. 5, 1950 |
| 2,721,306 | Riley et al. | Oct. 18, 1955 |